UNITED STATES PATENT OFFICE.

ROBERT GNEHM AND JAKOB SCHMID, OF BASLE, SWITZERLAND, ASSIGNORS TO THE SOCIETY OF CHEMICAL INDUSTRY IN BASLE, OF SAME PLACE.

BASIC YELLOW DYE.

SPECIFICATION forming part of Letters Patent No. 488,430, dated December 20, 1892.

Application filed June 23, 1892. Serial No. 437,689. (Specimens.)

*To all whom it may concern:*

Be it known that we, ROBERT GNEHM and JAKOB SCHMID, citizens of Switzerland, residing at Basle, Switzerland, have invented new and useful Improvements in the Production of a Basic Yellow Coloring-Matter or Dye-Stuff, of which the following is a specification.

This invention relates to a new auramine dye. The first known auramine dye is described in Letters Patent No. 301,802 granted July 8, 1884 to Heinrich Caro and Alfred Kern and was produced by the action of ammonia on tetramethyl-diamido-benzophenone. This dye is still the most important and valuable yellow basic color; it dyes on cotton mordanted with tannin and tartar emetic an orange shade of yellow. Our new dye which is obtained by the treatment of a new base—which we call dimethyl-diamido-diorthotolyl-methane—simultaneously with sulphur and ammonia, possesses the general character of an auramine dye and yields on cotton mordanted with tannin and tartar emetic pure yellow shades possessing a slightly greenish tinge.

The following examples will illustrate the invention and the manner of carrying it into practical effect. The parts are by weight.

*Example I. Preparation of dimethyl-diamido-diorthotolyl-methane—a new initial material for the production of an auramine dye.*
Mix together one molecular proportion of formaldehyde—in the form of, say, a forty per cent solution—with two molecular proportions of monomethyl-orthotoluidine and while keeping the mixture cold pass one molecular proportion of hydrochloric acid gas into the mixture. The monomethyl-ortho-toluidine need not be pure, but a mixture thereof with dimethyl-ortho-toluidine may be employed provided that the quantity of the mixture taken be such as to contain the required quantity of monomethyl-ortho-toluidine. Heat the product obtained for ten hours on the water bath. Dilute with water, add soda till alkaline and distil off any unaltered methyl-toluidine with steam. The mass remaining behind, solidifies on standing some time in the cold and can be purified by crystallization from alcohol or petroleum spirit. When pure the new base melts at a temperature of about 86°—87° centigrade. The mixture which is heated on the water bath can also be obtained in a manner slightly different from that described, namely by mixing one molecular proportion of formaldehyde with one molecular proportion of hydrochlorate of monomethyl-ortho-toluidine and one molecular proportion of free monomethyl-ortho-toluidine, the further treatment is identical. No claim is made in this application to this new initial material.

*Example II. Preparation of the new auramine dye.*—Mix together about twenty-five and a half parts of symmetrical dimethyl-diamido-diorthotolyl-methane (obtained as above described or in any other way) and about six and a half parts sulphur with a suitable diluent say for instance a mixture of two hundred and forty parts of common salt and fourteen parts of ammonium chloride. Heat the mixture in a closed vessel provided with a stirrer and standing in an oilbath which is maintained at a temperature of about 175° centigrate. Pass in under slight pressure a stream of dry ammonia gas and continue this treatment for about seven or eight hours, when the reaction will be ended. Allow to cool, extract the brown crystaline melt with cold water to get rid of the common salt and ammonium chloride and dissolve the residue in water having a temperature of about 80° centigrade, filter the solution and precipitate the dye with common salt. Collect in the usual way. Our new dye thus obtained is a yellow powder, readily soluble in water and alcohol but insoluble in benzene; it is the hydrochloric acid salt of a base which is a white solid soluble in ether. The following is a characteristic reaction for our new dyestuff: Dissolve one part in a mixture of about one hundred parts glacial acetic acid and one hundred parts water, boil and add about five parts of zinc dust and about five parts of concentrated hydrochloric acid. Continue boiling for a few minutes when a red violet solution will result. If the known orange-yellow auramine be similarly treated, a greenish blue solution is obtained.

The dyeing properties of our new dye have already been mentioned, owing to its purity of color and greenish tinge it is particularly useful in shading greens.

The rational formula of dimethyl-diamido-diorthotolylmethane, is—

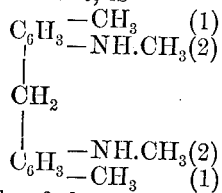

The formula of the new dyestuff when completely formed is:

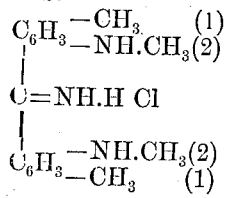

What we claim as new and desire to secure by Letters Patent is—

As a new product, the yellow coloring matter or dyestuff obtained from dimethyl-diamido-diorthotolyl-methane which is a yellow powder, readily soluble in water and in alcohol but insoluble in benzene and which on treatment with acetic acid, zinc dust and hydrochloric acid gives a violet red solution.

In testimony whereof we have hereunto set our hands and seals in the presence of two subscribing witnesses.

ROBERT GNEHM. [L. S.]
JAKOB SCHMID. [L. S.]

Witnesses:
GEORGE GIFFORD,
F. WATSER.